United States Patent [19]
DiPierno Bosco et al.

[11] Patent Number: 6,103,409
[45] Date of Patent: Aug. 15, 2000

[54] FUEL CELL FLOODING DETECTION AND CORRECTION

[75] Inventors: Andrew DiPierno Bosco, Rochester; Matthew Howard Fronk, Honeoye Falls, both of N.Y.

[73] Assignee: General Motors Corporation, Detroit, Mich.

[21] Appl. No.: 09/021,213

[22] Filed: Feb. 10, 1998

[51] Int. Cl.[7] .................................................. H01M 8/04
[52] U.S. Cl. ................................................. 429/13; 429/25
[58] Field of Search ........................................ 429/25, 13

[56] References Cited

U.S. PATENT DOCUMENTS 5,763,113  6/1998  Meltser et al. ............................ 429/13

FOREIGN PATENT DOCUMENTS

| 59-75572 | 4/1984 | Japan . |
| 2-86069 | 3/1990 | Japan . |
| 6-203860 | 7/1994 | Japan . |

*Primary Examiner*—Maria Nuzzolillo
*Assistant Examiner*—Jonathan Crepeau
*Attorney, Agent, or Firm*—Lawrence B. Plant

[57] ABSTRACT

Method and apparatus for monitoring an $H_2$–$O_2$ PEM fuel cells to detect and correct flooding. The pressure drop across a given $H_2$ or $O_2$ flow field is monitored and compared to predetermined thresholds of unacceptability. If the pressure drop exists a threshold of unacceptability corrective measures are automatically initiated.

7 Claims, 4 Drawing Sheets

FUEL CELL FLOODING DETECTION AND CORRECTION

The Government of the United States of America has rights in this invention pursuant to contract No. DE-AC02-90CH10435 awarded by the United States Department of Energy.

TECHNICAL FIELD

This invention relates to method and apparatus for monitoring PEM fuel cell stacks to detect and correct flooding.

BACKGROUND OF THE INVENTION

PEM (i.e., Proton Exchange Membrane) fuel cells [a.k.a. SPE (Solid Polymer Electrolyte) fuel cells] are well known in the art, and include a "membrane-electrode-assembly" comprising a thin, proton-transmissive, solid polymer, membrane-electrolyte having an anode on one of its faces and a cathode on the opposite face. The membrane-electrode-assembly [a.k.a. MEA] is sandwiched between a pair of electrically conductive elements which (1) serve as current collectors for the anode and cathode, and (2) contain a plurality of flow channels therein for distributing the fuel cell's gaseous reactants, $H_2$ and $O_2$ (e.g., air), over the surfaces of the respective anode and cathode catalysts. The flow channel for each reactant is often referred to as a "flow field" for that reactant (e.g., $H_2$ flow field). A plurality of individual fuel cells are commonly bundled together to form a PEM fuel cell stack, and the stack forms part of a fuel cell system that includes ancillary devices such as reformers, shift reactors, combusters, compressors, humidifiers, fuel storage, pumps and controllers, inter alia.

The solid polymer membranes are typically made from ion exchange resins such as perfluorinated sulfonic acid. One such resin is NAFION® sold by E.I. DuPont deNemours & Co. Such membranes are well known in the art and are described in U.S. Pat. Nos. 5,272,017 and 3,134,697, and in Journal of Power Sources, Volume 29 (1990) pages 367–387, inter alia. The anode and cathode on the membrane's faces typically comprise finely divided carbon particles, very finely divided catalytic particles supported on the carbon particles, and proton conductive resin intermingled with the catalytic and carbon particles. One such membrane-electrode-assembly and fuel cell is described in U.S. Pat. No. 5,272,017 issued Dec. 21, 1993 and assigned to the assignee of the present invention.

Typically, fuel cell systems are designed so that under normal operating conditions the flow rate of the reactants to the stack will increase as the electrical current demand on the stack increases, and vice-versa. For the cathode (air) this is typically accomplished by increasing or decreasing the system's compressor output in response to the stack's electrical output. For the anode ($H_2$) this may be accomplished by increasing the pressure regulator on a tank-supplied system, or increasing the fuel supply rate to a reformer in a reformer-supplied system. Likewise under normal operating conditions, both reactant streams are typically humidified, upstream of the stack, to prevent drying of the membrane. In this regard, the reactant streams may either be routed through a membrane or filter-type humidifier, or preferably will have water injected thereinto by means of appropriate injectors. The fuel cell reaction forms water on the cathode side of the membrane.

PEM fuel cell stack performance can degrade for a number of reasons including flooding of the cells with $H_2O$. Under normal operating conditions, water will not accumulate in the flow fields, because it is flushed out by the flowing reactant gases. However, sometimes the relative humidity in the reactant streams can exceed 100%, which causes water to condense and form droplets. When these droplets are allowed to build-up over time, the flow fields become partially or totally obstructed (known as "flooding") which prevents (a) the reactants from reaching the reaction sites, and (b) the reaction water from exiting the flow field(s). This, in turn, results in a sharp degradation in stack performance, and requires corrective action.

SUMMARY OF THE INVENTION

The present invention contemplates method and apparatus for monitoring PEM fuel cells to detect and correct any flooding that might occur therein. Corrective action may be simply alerting the cell's operator to take corrective action. Preferably however, corrective action will automatically be initiated by triggering certain preprogrammed corrective procedures which may include, but is not limited to,: (1) dehumidifying either or both reactant streams to promote vaporization of the water in the flow field(s); (2) increasing the mass flow rate of the reactants to flush the water out of the flow field(s); (3) reducing the absolute pressure of the reactant gases not only promotes vaporization of the water in the flow field(s) but decreases the density of the gas so that for the same mass flow rate the velocity of the gas increases and the pressure drop across the flow field increases to flush the water from the flow field; and/or (4) temporarily reducing the electrical current being drawn from the stack to reduce the rate at which water is electrochemically produced. Generally, the invention contemplates method and apparatus for (1) determining the pressure drop across one or both the hydrogen and oxygen flow fields of a fuel cell stack at a given electrical discharge rate (i.e., current drawn from the stack), (2) comparing that pressure drop to acceptable reference pressure drops (i.e., in a lookup table) determined empirically from a substantially identical, unflooded stack at various electrical discharge rates, and (3) triggering corrective action when the measured pressure drop of the stack being monitored is equal to or exceeds a predetermined threshold of unacceptable pressure drop set for the same discharge rate as the stack being monitored.

From a hardware perspective, the invention involves a conventional stack of $H_2$–$O_2$ PEM fuel cells wherein the cells each comprise principally a proton exchange membrane having an anode and a cathode affixed to opposing first and second surfaces thereof. An hydrogen flow field is provided adjacent the anode for flowing hydrogen into contact with the anode. An oxygen flow field is provided adjacent the cathode for flowing an oxygen-bearing gas (e.g., air) into contact with the cathode. An hydrogen supply manifold supplies the hydrogen to the hydrogen flow field, and an oxygen supply manifold supplies the oxygen-bearing gas to the oxygen flow field. An hydrogen exhaust gas manifold receives hydrogen from the hydrogen flow field, and an oxygen exhaust gas manifold receives oxygen-bearing gas from the oxygen flow field. In accordance with the present invention, the PEM fuel cell stack includes a pressure drop sensor means communicating with the oxygen supply and exhaust manifolds for determining the pressure drop across the oxygen flow fields that separate the oxygen supply and exhaust manifolds. The pressure drop sensor triggers initiation of corrective measures (e.g., alert operator for manual corrections) to reduce flooding of the oxygen flow field. Preferably, the fuel cell stack will also include second pressure drop sensor means communicating with the hydrogen supply and exhaust manifolds for determining a second pressure drop therebetween, and triggering similar corrective action. The pressure drop sensor means may include discrete pressure sensors for the supply and exhaust manifolds from which pressure drop can be calculated by subtracting the pressure $P_2$ in the exhaust manifold from the pressure $P_1$ in the supply manifold. Preferably, the pressure drop sensor means will be a differential pressure device, such as a piezo-electric differential pressure transducer, which measures pressure drop, $\Delta P$, directly, without the need to make a calculation.

Methodwise, the invention contemplates a process for monitoring a stack of $H_2$–$O_2$ PEM fuel cells for flooding, and triggering corrective action when flooding occurs. More specifically, pressure drop sensor means is used to determine the pressure drop, $\Delta P_o$, between the oxygen supply and exhaust manifolds at a particular electrical discharge rate of the stack. This $\Delta P_o$ is then compared to pressure drops previously empirically determined by measuring the pressure drop, $\Delta P_R$, at the same electrical discharge rate across the oxygen flow fields of an unflooded, reference fuel cell stack having oxygen flow fields substantially identical to the oxygen flow fields of the stack being monitored. If the $\Delta P_o$ is equal to or exceeds a predetermined threshold of unacceptable pressure drop that is set by the stack's designer at a level above the reference pressure drop $\Delta P_R$, a signal is generated that initiates corrective measures to reduce flooding of the oxygen flow fields. For example, the threshold of unacceptable oxygen pressure drop might be set at 20% greater than the reference pressure drop $\Delta P_R$. In the preferred embodiment, a similar process is undertaken to compare the pressure drop $\Delta P_h$ across the hydrogen flow fields to a reference pressure drop for the hydrogen.

Suitable corrective actions include: (1) alerting the stack operator to manually correct the situation; (2) automatically increasing the mass flow rate (preferred) of the reactant gas(es) to force any water accumulated in the flow field(s) into the corresponding exhaust manifold(s); (3) automatically reducing the absolute pressure of the reactant gas(es) to promote vaporization and flushing of the water in and from the flow field(s); (4) automatically dehumidifying the reactant gas(es) to promote vaporization of any water in the flow field(s); (5) automatically reducing the discharge rate of the stack to reduce the rate at which water is electrochemically formed in the stack; or (6) combinations of the aforesaid.

BRIEF DESCRIPTION OF THE DRAWINGS

The invention will be better understood when considered in the light of the following detailed description thereof which is given hereafter in conjunction with the following drawings of which.

DESCRIPTION OF AN EMBODIMENT OF THE INVENTION

Figure 1:
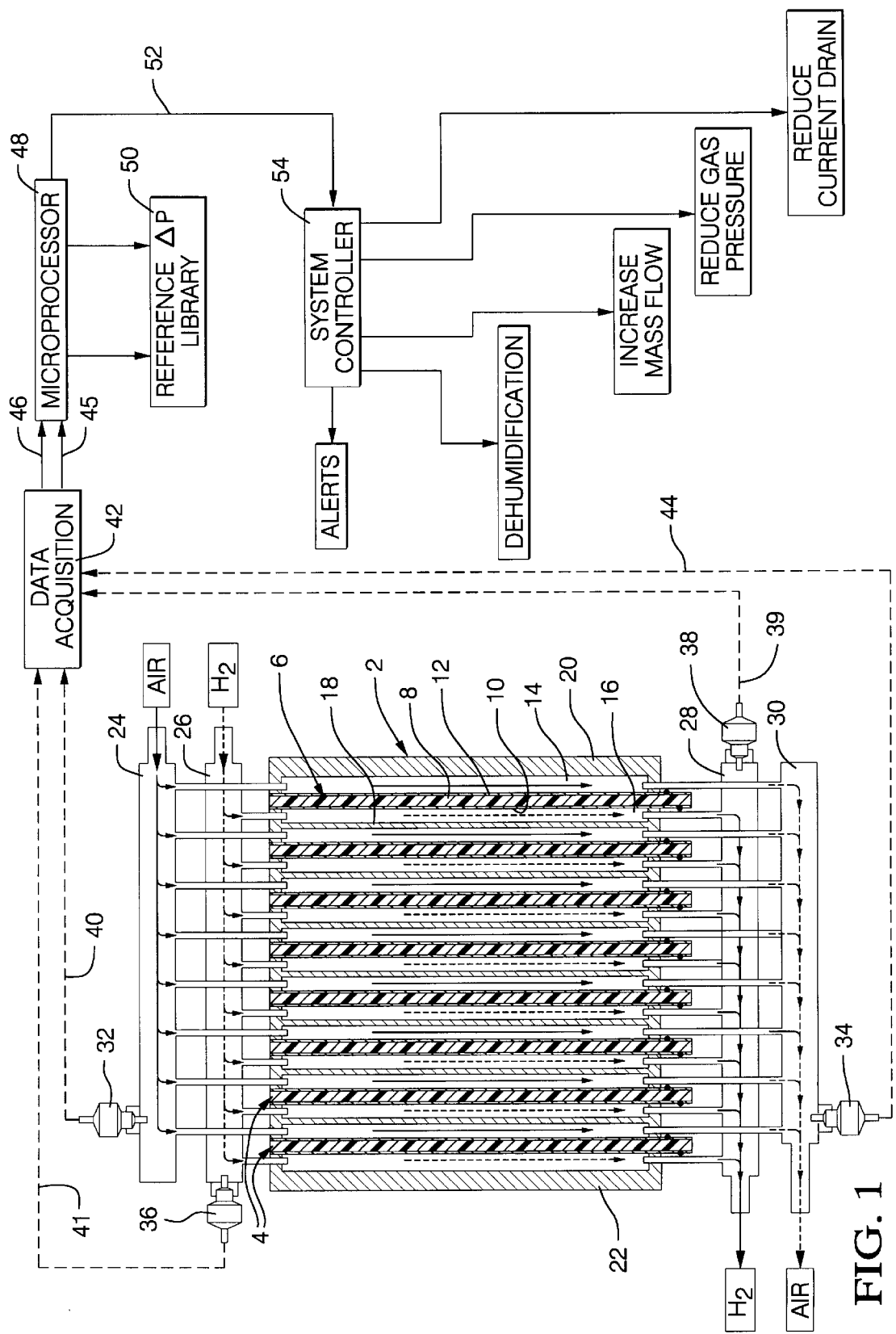
FIG. 1 is a schematic of a bipolar, PEM fuel cell stack, and flood monitoring system therefor.

FIG. 1 depicts a stack 2 of individual fuel cells 4 each comprising a membrane electrode assembly 6 having a proton conductive resin membrane 8 with an anode 10 on one face thereof and a cathode 12 on the opposite face thereof. A cathode flow field 14 is provided adjacent the cathode 12 for flowing an oxygen-rich gas (i.e., preferably air) by, and into contact with, the cathode 12. Similarly, an anode flow field 16 is provided adjacent the anode 10 for flowing hydrogen fuel by, and into contact with, the anode 10. The membrane 8 will preferably comprise a perfluorinated sulfonic acid polymer such as NAFION® as is well known in the PEM fuel cell art. Each individual cell 4 is separated from the next in the stack 2 by a bipolar plate 18, which is a conductive plate (e.g., metal, carbon, etc.) which separates the several cells one from the next while permitting electrical current to flow therethrough directly from one cell to the next in an electrical series connection of the several cells 4 in the stack 2. The bipolar plates 18 include a plurality of ribs or lands (not shown) thereon that engage the anode 10 and cathode 12 and collect current therefrom. The ribs/lands define a plurality of grooves or channels (not shown) which form the flow fields 14 and 16 through which the $O_2$ and $H_2$ flow respectively. End plates 20 and 22 terminate the stack and define the respective cathode and anode flow fields for the end cells of the stack. A cathode gas supply manifold 24 distributes the cathode gas (e.g., air) to the several cathode flow fields 14. Similarly, an anode supply manifold 26 distributes hydrogen fuel to the several anode flow fields 16. A hydrogen exhaust manifold 28 collects unused hydrogen from the several anode flow fields 16. Unconsumed $H_2$ may be recirculated back to the supply manifold 26 for reuse or used elsewhere in the system (e.g., to fire combustors that heat the system's fuel reformer). Similarly, a cathode exhaust gas manifold 30 collects exhaust gas from the cathode flow fields 14.

A first pressure sensor 32 communicates with the cathode $O_2$/air supply manifold 24, and a second sensor 34 communicates with the cathode $O_2$/air exhaust manifold 30. The flood monitoring process of the present invention need only be used for the cathode flow fields 14 where the water accumulates more quickly owing to the formation of reaction water therein. However, it is desirable to also monitor the anode flow fields as well, and when this is done, a third pressure sensor 36 communicates with the hydrogen supply manifold 26, and a fourth pressure sensor 38 communicates with the hydrogen exhaust manifold 28 in order to also monitor flooding of the anode flow field 16. Otherwise, only the cathode flow fields 14 are monitored.

Figure 2:
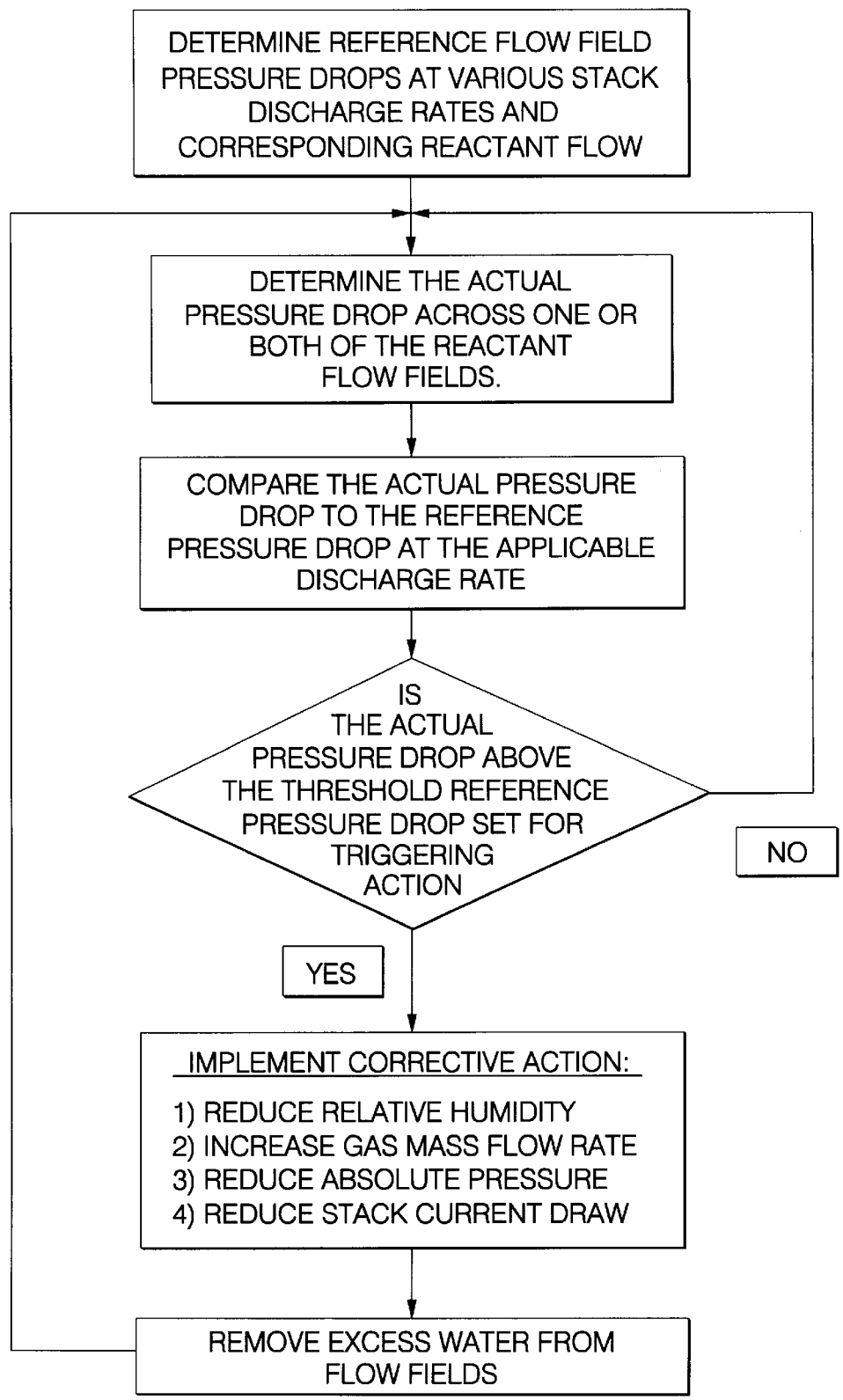
FIG. 2 is a flow diagram illustrating the process of the present invention used to monitor the stack flooding and initiate corrective measures if flooding occurs.
Figure 3:
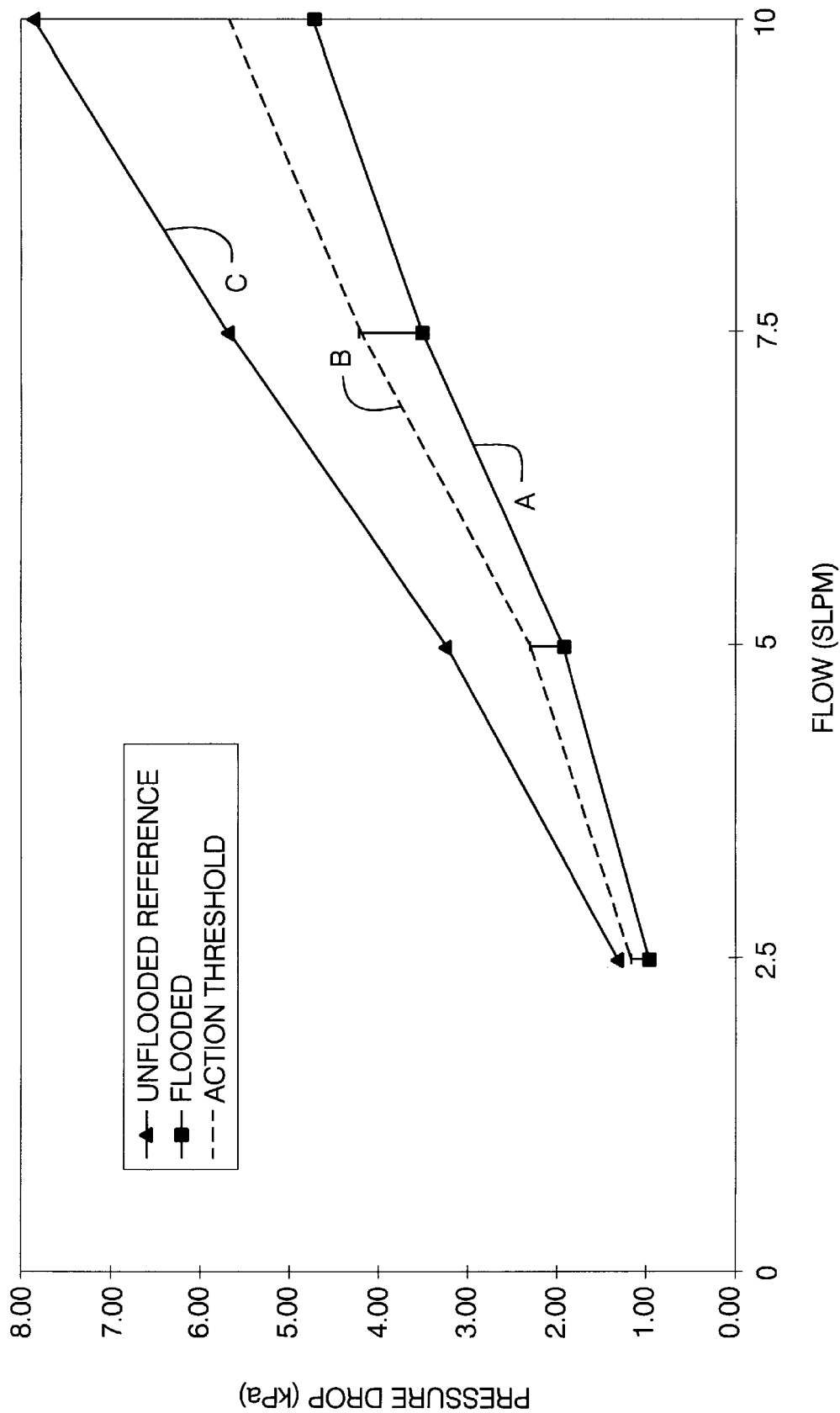
FIG. 3 is a set of curves depicting pressure drops across an oxygen flow field in a flooded and unflooded condition.

The sensor 32 measures the pressure in the supply manifold 24 and sends a signal 40 to data acquisition unit 42. The sensor 34 measures the pressure in the exhaust manifold 30 and sends a signal 44 to the data acquisition unit 42. Similarly, the sensor 36 measures the pressure in $H_2$ supply manifold 26 and sends a signal 41 to data acquisition unit 42 while sensor 38 measures the pressure in $H_2$ exhaust manifold 28 and sends a signal 39 to data acquisition unit 42. The data acquisition unit 42 is essentially an analog to digital converter which sends digital data streams 45 and 46 to a microprocessor 48 which calculates the pressure difference (i.e., pressure drop $\Delta P$) between the appropriate supply and exhaust manifolds. At the same time, an electrical current sensor, e.g., ammeter, (not shown) senses the current being drawn from the stack and sends a signal to the microprocessor 48 indicative of the current being drawn. The microprocessor 48 calculates the pressure differences $\Delta P$ between the supply and exhaust manifolds, then compares these pressure drops ($\Delta P$) in the stack being monitored to reference pressure drops taken the same current flow levels ($\Delta P_R$) and stored in reference library 50. When a differential pressure transducer is used, there is no need for the ΔP calculation and the ΔP registered by the transducer can be directly compared to the reference pressure drops. Oxygen reference pressure drops ($\Delta P_R$) are determined by measuring the pressure drop across oxygen flow fields of a reference fuel cell stack that is substantially identical to the flow fields of the stack being monitored and which is operated in an unflooded condition. The reference stack need not be a separate stack, but may be the stack being monitored but operated under controlled conditions to prevent flooding. Reference $\Delta P_R$ pressure drops are measured at various stack discharge rates (i.e., current flow) and represent acceptable pressure drops. A threshold level of unacceptable pressure drop for each discharge rate is then set above (e.g., +20%) the measured rate and used as the reference value above which corrective action is triggered. This threshold of unacceptable pressure drop is stored in the library 50 for comparison to the actual $\Delta P_o$'s determined from the stack being monitored. For example, curve A of FIG. 3 is a plot of the pressure drops measured at various oxygen flow rates in an unflooded stack having a particular oxygen flow field configuration. Flooding of a monitored stack is indicated when the measured $\Delta P_o$ curve C at a given oxygen flow rate (which corresponds to a particular electrical discharge rate) exceeds a predetermined threshold level. Hence for example, curve B of FIG. 3 is set at 20% greater than the pressure drops actually measured (i.e., curve A) in the unflooded stack, and represents the threshold of unacceptable pressure drops above which corrective action is needed. If the $\Delta P_o$ of the stack being monitored (see curve C of FIG. 3) exceeds the predetermined threshold value (curve B) at a particular stack discharge rate, the microprocessor 48 sends a signal 52 to a system controller 54 which alerts the stack operator, and/or automatically initiates any of several possible alternatives to correct flooding. The aforesaid process steps are depicted in the process flow diagram shown in FIG. 2.

The microprocessor 48 includes a common digital computer with associated read-only memory (ROM), read-write random access memory (RAM), electrically programmable read-only memory (EPROM), memory for storing a library of predetermined reference $H_2$ and $O_2$ for pressure drops at different stack discharge rates for comparing to the pressure drops produced by the stack being monitored and input/output sections which interface with the data acquisition unit 42 and a system controller 54 that controls the operation of the stack 2. The read-only memory (ROM) of the digital computer contains the instructions necessary to implement the basic input/output instructions. The electrically programmable read-only memory (EPROM) contains the instructions necessary to implement the data processor's own internal control, data manipulation, and communication algorithms. The microprocessor 48 communicates with the data acquisition unit 42 and the system controller 54 by means of any appropriate communication network protocol, many of which are known in the art. A standard 486 or Pentium computer with 16 meg of RAM, Running Windows® 3.1 or Windows® 95, and fitted with an ACB 530 bus control board is adequate for this purpose. A specific program for carrying out the functions of the processor 48 may be accomplished by standard skill in the art using conventional information processing languages.

Figure 4:
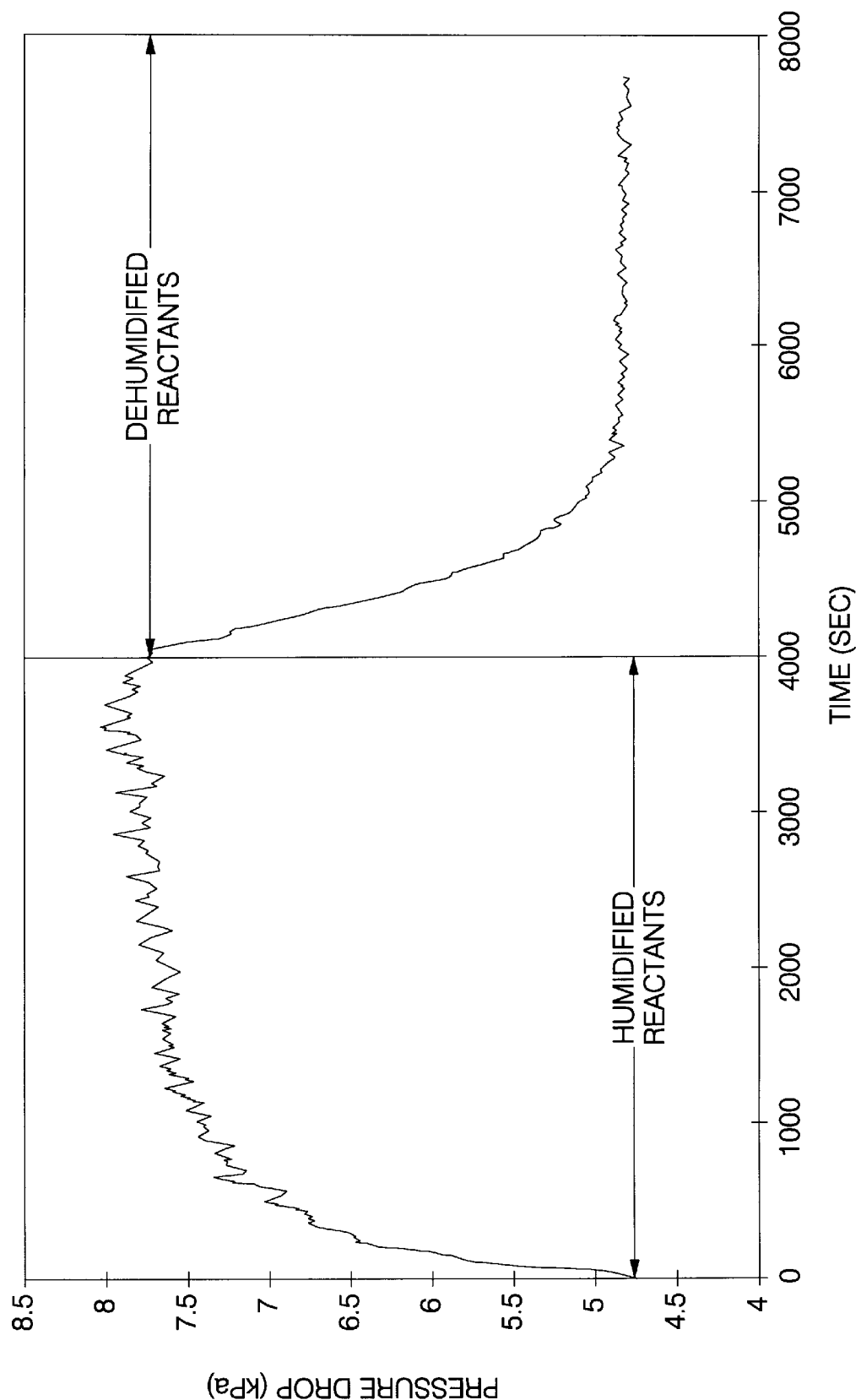
FIG. 4 is a plot of the pressure drop across an oxygen flow field before and after dehumidification of the oxygen feed stream.

One form of corrective action that could be taken to reduce flooding is to dehumidify the reactant stream(s), by discontinuing the addition of water thereto upstream of the stack. Hence for example, the water injector used to humidify the stream may simply be shut off for as long as may be needed to dry out the flow field. FIG. 4 depicts the results of one test, and is a plot of the pressure drop across the cathode flow field of a fuel cell as a function of time. Using humidified reactants, water is allowed to accumulate in the flow field during the first 4000 seconds of operation, and the pressure drop builds. After 4000 seconds has elapsed, the humidified reactants are replaced with dry reactants, and the pressure drop decreases to the starting pressure drop in about 1000 seconds as the flow field dried out. A preferred alternative to dehumidification is to increase the mass flow rate of the reactants, by example, by increasing the output of the system's compressor upstream of the stack to force the water out of the $O_2$ flow fields. This latter approach is preferred as it is the quickest way to purge the flow fields of unwanted water, so that normal operations can be resumed. Increasing the flow rate also increases the pressure drop which provides the additional force needed to blow the flow field clear. It likewise increases flow velocity through the field, which in turn provides more shear force to induce droplet movement through the field.

While the invention has been disclosed primarily in terms of specific embodiments thereof it is not intended to be limited thereto but rather only to the extent set forth hereafter in the claims which follow.

We claim:

1. In a fuel cell system stack of $H_2$-$O_2$ PEM fuel cells each comprising a proton exchange membrane having an anode and a cathode affixed to opposing first and second surfaces respectively, a hydrogen flow field adjacent said anode electrode for flowing hydrogen into contact with said anode, and oxygen flow field adjacent said cathode for flowing an oxygen-bearing gas into contact with said cathode, a hydrogen supply manifold for supplying hydrogen to said hydrogen flow field, an oxygen supply manifold for supplying said oxygen-bearing gas to said oxygen flow field, a hydrogen exhaust gas manifold for receiving hydrogen from said hydrogen flow field, and an oxygen exhaust gas manifold for receiving oxygen-bearing gas from said oxygen flow field, the improvement comprising a flooding detector comprising first pressure sensor means communicating with said oxygen supply and exhaust manifolds for determining a first pressure drop between said oxygen supply and exhaust manifolds and a system controller responsive to said first pressure drop for alerting the stack's operator and/or initiating corrective measures if said first pressure drop exceeds a first predetermined threshold level of unacceptability indicative of water accumulating within the stack and blocking said oxygen flow field.

2. A fuel cell stack according to claim 1 further comprising second pressure sensor means communicating with said hydrogen supply and exhaust manifolds for determining a second pressure drop between said hydrogen supply and exhaust manifolds and a system controller responsive to said second pressure drop for alerting the stack's operator and/or initiating corrective measures if said second pressure drop exceeds a second predetermined threshold level of unacceptability indicative of water accumulating within the stack and locking said hydrogen flow field.

3. A method for monitoring a stack of $H_2$-$O_2$ PEM fuel cells for flooding and alerting the stack's operator and/or triggering corrective action when flooding occurs, said stack comprising a plurality of $H_2$-$O_2$ PEM fuel cells each comprising a proton exchange membrane having an anode and a cathode affixed to opposing first and second surfaces respectively, a hydrogen flow field adjacent said anode electrode for flowing humidified hydrogen into contact with said anode, and oxygen flow field adjacent said cathode for flowing a humidified, oxygen-bearing gas into contact with said cathode, a hydrogen supply manifold for supplying humidified hydrogen to said hydrogen flow field, an oxygen supply manifold for supplying humidified, oxygen-bearing gas to said oxygen flow field, a hydrogen exhaust gas manifold for receiving hydrogen from said hydrogen flow field, and an oxygen exhaust gas manifold for receiving oxygen-bearing gas from said oxygen flow field, comprising the steps of:

a. determining the pressure drop $\Delta P_o$, between said oxygen supply and exhaust manifolds at a particular electrical discharge rate of said stack;

b. from an unflooded, reference fuel cell stack having oxygen flow fields substantially identical to the oxygen flow fields of the stack being monitored, determining a plurality of oxygen reference pressure drops, $\Delta P_R$, at various electrical discharge rates;

c. from the reference pressure drops determined from step "b", setting a predetermined threshold of unacceptable oxygen pressure drop for various electrical discharge rates of the stack;

d. comparing the $\Delta P_o$ determined in step "a" to the oxygen reference pressure drop $\Delta P_R$ determined in step "b" at the same discharge rate as the stack being monitored;

e. outputting a first signal from step "d" when $\Delta P_o$ is equal to or exceeds said predetermined threshold of unacceptable oxygen pressure drop; and f. in response to said first signal, initiating corrective measures to reduce flooding of said oxygen flow fields.

4. A method according to claim 3 including the step of increasing the mass flow rate of said oxygen-bearing gas to reduce said flooding.

5. A method according to claim 3 including the step of reducing the absolute pressure of the oxygen-bearing gas to reduce said flooding.

6. A method according to claim 3 including the step of substantially dehumidifying the oxygen-bearing gas to reduce said flooding.

7. A method according to claim 3 including:

g. determining the pressure drop, $\Delta P_h$, between said hydrogen supply and exhaust manifolds at a particular electrical discharge rate of said stack;

h. from an unflooded, reference fuel cell stack having hydrogen flow fields substantially identical to the hydrogen flow fields of the stack being monitored, determining a plurality of hydrogen reference pressure drops $\Delta P'_R$ at various electrical discharge rates;

i. from the hydrogen reference pressure drops determined in step "h", setting a predetermined threshold of unacceptable hydrogen pressure drop for various electric discharge rates of the stack;

j. comparing the $\Delta P_h$ determined in step "g" to the hydrogen reference pressure drop $\Delta P'_R$, determined in step "h" at the same discharge rate as the stack being monitored:

k. outputting a second signal from step "j" when $\Delta P_h$ is equal to or exceeds said predetermined threshold of unacceptable hydrogen pressure drop; and l. in response to said second signal, initiating corrective measures to reduce flooding of said hydrogen flow fields.

* * * * *